United States Patent
Baur et al.

(10) Patent No.: US 7,516,691 B2
(45) Date of Patent: Apr. 14, 2009

(54) HYDRAULIC LINEAR DRIVE, PARTICULARLY A HYDRAULIC TRANSMISSION ACTUATOR

(75) Inventors: Peter Baur, Moensheim (DE); Serge Nassif, Mundolsheim (DE)

(73) Assignee: Dr. Ing. H.C.F. Porsche Aktiengesellschaft, Stuttgart (DE)

( * ) Notice: Subject to any disclaimer, the term of this patent is extended or adjusted under 35 U.S.C. 154(b) by 258 days.

(21) Appl. No.: 10/593,495

(22) PCT Filed: Mar. 17, 2005

(86) PCT No.: PCT/EP2005/002829
§ 371 (c)(1),
(2), (4) Date: Sep. 20, 2006

(87) PCT Pub. No.: WO2005/114007
PCT Pub. Date: Dec. 1, 2005

(65) Prior Publication Data
US 2007/0213172 A1    Sep. 13, 2007

(30) Foreign Application Priority Data
May 7, 2004    (DE) .................. 10 2004 022 723

(51) Int. Cl.
*F16J 9/00*    (2006.01)
*F01B 1/02*    (2006.01)
(52) U.S. Cl. .................. 92/250; 92/61; 92/255
(58) Field of Classification Search .............. 92/61, 92/75, 205, 247, 250, 255
See application file for complete search history.

(56) References Cited

U.S. PATENT DOCUMENTS

| | | | | |
|---|---|---|---|---|
| 1,732,502 A | * | 10/1929 | Cox | ............ 425/282 |
| 2,755,779 A | | 7/1956 | Muller | |
| 3,744,382 A | * | 7/1973 | Williams | ............ 92/250 |
| 4,064,788 A | | 12/1977 | Rich et al. | |

FOREIGN PATENT DOCUMENTS

| | | |
|---|---|---|
| DE | 32 04 358 A1 | 11/1982 |
| DE | 199 03 511 A1 | 8/2000 |
| EP | 0 602 425 A1 | 6/1994 |
| JP | 59-50206 A | 3/1984 |
| WO | WO 02/079666 A1 | 10/2002 |

OTHER PUBLICATIONS

Johannes Looman; "Zahnradgetriebe", Konstrucktionsbuecher Band 26, Second Edition, pp. 156-158.
International Search Report dated Jun. 2, 2005 including English translation of relevant portion (Five (5) pages).

* cited by examiner

*Primary Examiner*—Michael Leslie
(74) *Attorney, Agent, or Firm*—RatnerPrestia

(57) ABSTRACT

A hydraulic linear drive, particularly a hydraulic transmission actuator, having a piston/cylinder unit, in which an actuating piston longitudinally displaceably arranged in the cylinder housing divided into at least two pressure chambers which can be acted upon by hydraulic oil by way of control conduits. A piston rod is connected with the actuating piston, and a sealing element is arranged on the actuating piston to seal off the two pressure chambers from one another. The actuating piston has a two-piece construction and consists of a first and a second piston part between whose facing faces, a sealing element is arranged.

8 Claims, 2 Drawing Sheets

HYDRAULIC LINEAR DRIVE, PARTICULARLY A HYDRAULIC TRANSMISSION ACTUATOR

BACKGROUND OF THE INVENTION

The present invention relates to a hydraulic linear drive, particularly a hydraulic transmission actuator, in which an actuating piston longitudinally displaceably arranged in the cylinder housing in the cylinder space into at least two pressure chambers which can be acted upon by hydraulic oil by way of control conduits, and having a piston rod connected with the actuating piston, as well as having a sealing element arranged on the actuating piston, by means of which sealing element, the at least two pressure chambers are sealed off from one another.

Hydraulic linear drives are used, for example, in the case of automated standard transmissions, for the synchronization of the transmission gears (see, for example, Johannes Loomann, "Zahnradgetriebe", 2nd Edition, pg, 156, and on).

In the case of the hydraulic linear drives of the above-mentioned type, the dual piston bounded by two pressure chambers is in each case pushed toward the left or right as a result of correspondingly being acted upon by pressure. In many of the application cases, the two pressure chambers are sealed off by sealing elements arranged on the outer circumference of the piston.

Particularly in the case of hydraulic transmission actuators, high actuating forces are applied during the synchronization of the transmission gears-and require a reliable and durable sealing-off or separation of the two pressure chambers.

SUMMARY OF THE INVENTION

An object of the present invention to improve the sealing-off of the two pressure chambers in the area of the piston unit. This object has been achieved by the fact that the actuating piston is constructed in two parts and a sealing element is arranged between the two piston parts. The sealing element is clamped between the two piston parts when the piston unit is adjusted and, because of the actuating forces to be applied, for example, during the synchronization of the transmission gear, is pressed radially toward the outside to a certain extent. Thereby the sealing between the actuating piston and the interior cylinder wall is advantageously improved.

The sealing element constructed as a sealing ring is received on a sealing device carrier which is axially guided on one of the two piston parts.

For a better axial guidance of the sealing device carrier, the latter engages on the face in the first piston part.

The sealing device carrier is shaped in one piece out of one of the two piston parts or, as an alternative, is arranged as a separate component between the two piston parts.

The sealing device carrier is advantageously longitudinally displaceably disposed on the first piston part, for limiting the contact pressure force exercised upon the sealing ring. The relative movement of the sealing device carrier is limited by two stops constructed on the first piston part.

An advantageous embodiment of a hydraulic linear drive which is adapted to the use as a hydraulic transmission actuator is obtained when the two piston parts and the cylinder housing have a stepped construction. As a result of the step piston which provides in this manner, in a first adjusting path, a high adjusting speed can be achieved with a low friction. Because of a large piston diameter, a high actuating force can be generated about the synchronization point and thus a high radial contact pressure force of the sealing ring against the interior wall of the cylinder housing.

A longitudinal groove is formed in the surface area of the piston part section having a reduced diameter. The longitudinal groove in each case connects a first hydraulic chamber section with a second hydraulic chamber section of the two step pistons.

One control conduit respectively is connected to the two first hydraulic chamber sections of the two step pistons, which control conduit is used for the feeding or removal of hydraulic oil.

Other objects, advantages and novel features of the present invention will become apparent from the following detailed description of the invention when considered in conjunction with the accompanying drawings.

DETAILED DESCRIPTION OF THE INVENTION

Figure 1:
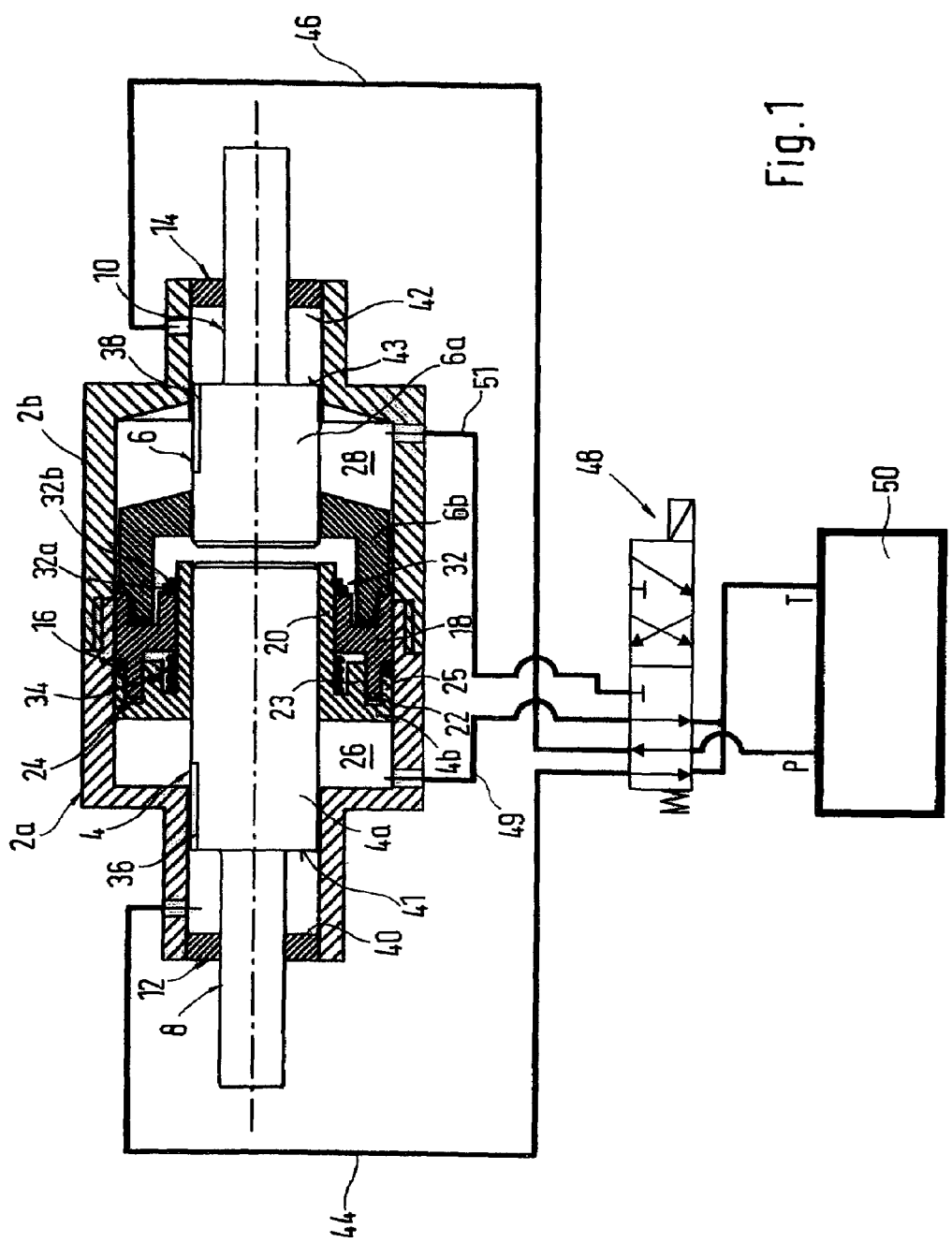
FIG. 1 is a partial cross-sectional view of a linear drive with a schematically shown hydraulic control according to a first embodiment of the present invention.

The hydraulic linear drive illustrated in FIG. 1 can be used, for example, as a hydraulic transmission actuator for an automated standard transmission. The drive has a two-part cylinder housing 2a, 2b, which parts are both mutually connected, preferably screwed together, on their faces. In the cylinder space formed by the cylinder housing 2a, 2b, two piston parts called step pistons 4, 6 are received and, both being equipped with one piston rod 8, 10 respectively guided out of the cylinder housing 2, are longitudinally displaceably guided in the cylinder housing 2. In this case, the sealing-off of each of the two pistons rods 8, 10 takes place by one respective sealing ring 12, 14. The two step pistons 4, 6 each have two piston sections 4a, 4b and 6a, 6b respectively, in which a sealing device carrier 18 with a sealing ring 16 is arranged between the mutually facing faces of the pistons section 4b, 6b provided with a larger diameter.

The sealing device carrier 18 is disposed on an interior ring flange section 20 of the piston section 4b and, on its right face, is screwed to the piston section 6b of the step piston 6, while, on its left face, it engages by way of a ring flange 22 in a gearing manner in a ring groove 24 constructed between a central ring flange section 23 and an outer ring flange section 25 of the piston section 4b. The sealing ring 16 is pushed onto the ring flange 22 and correspondingly seals off the two pressure chambers 26, 28 from one another which are separated by the step pistons 4, 6.

For limiting the sealing device carrier 18 longitudinally displaceably disposed on the interior ring flange section 20, a left and a right stop is provided. The left stop is formed by the central ring flange section 23 of the piston section 4b, and the right step 32 is formed by a limit stop washer 32a which is axially secured by a snap ring 32b received in a ring groove. Further, a flat coil spring 34, which is arranged on the interior ring flange section 20, is accommodated in a ring groove forming between the interior and central ring flange section 20, 23 and is therefore clamped in between the sealing device carrier 18 and the piston section 4b.

The surface area of the two piston sections 4a, 6a respectively has a respective longitudinal groove 36, 38 each of which hydraulically connects the respective pressure chamber 26, 28 with a respective second pressure chamber 40, 42.

The two pressure chambers 40, 42, namely, first pressure chambers, are bounded in each case by the respective face 41, 42 of the piston section 4a, 6a and the face of the respective sealing ring 12, 14. One hydraulic conduit 44, 46 respectively is connected to the two first pressure chambers 40, 42 so that by way of a 7/2-way control valve 48, the pressure chambers 40, 42 can optionally be supplied with hydraulic oil from a tank 50. One return flow conduit 49, 51 is in each case connected to the respective two pressure chambers 26, 28, namely, second pressure chambers. The return flow conduit 49, 51 can optionally be connected by way of the control valve 48 with the tank 50.

In the control position of the 7/2-way valve 48, the first pressure chamber 42 is acted upon by hydraulic oil by the hydraulic conduit 46 for the displacement of the two step pistons 4, 6 toward the left. The actuating force exercised on the face 43 of the piston section 6a displaces the piston unit consisting of the two step pistons 4, 6 toward the left. In that case, after a first adjusting path, by way of the longitudinal groove 38 connecting the two pressure chambers 42, 28, the second pressure chamber 28 is also filled with hydraulic oil.

After moving a further distance, the hydraulic oil arrives in an unthrottled manner from the first pressure chamber 42 in the second pressure chamber 28 and acts exclusively with respect to the piston section 6b with the larger diameter. Thus, on the one hand, the adjusting rate of the actuating piston 4, 6 is reduced but, on the other hand, the actuating force acting upon the step piston 6 is increased. Simultaneously, the hydraulic oil situated in the first and second pressure chamber 40, 26 of the opposite side is returned into the tank 50 by the return conduit 49 and the hydraulic conduit 44. The fact that the piston unit 4, 6 is displaced against a resistance, has the effect that the sealing ring 16 clamped in between the exterior ring flange section 25 of the piston section 4b and the sealing device carrier 18 deforms elastically and is thereby pressed radially against the interior wall of the cylinder housing 2.

The hydraulic linear drive can be used, for example, as a hydraulic transmission actuator, in which case a shift fork engaging in a gearshift sleeve unit is axially displaced by the transmission actuator for establishing a non-rotatable connection between the gearshift sleeve and the transmission gear. In such case, a high adjusting speed with a low friction is reached by way of a first adjusting path via the two piston sections 4a, 6a respectively which have the smaller diameter, while about the synchronization point, a high radial contact pressure force of the sealing ring 16 can be achieved with respect to the interior cylinder wall via the two piston sections 4b, 6b respectively which have a larger diameter.

Figure 2:
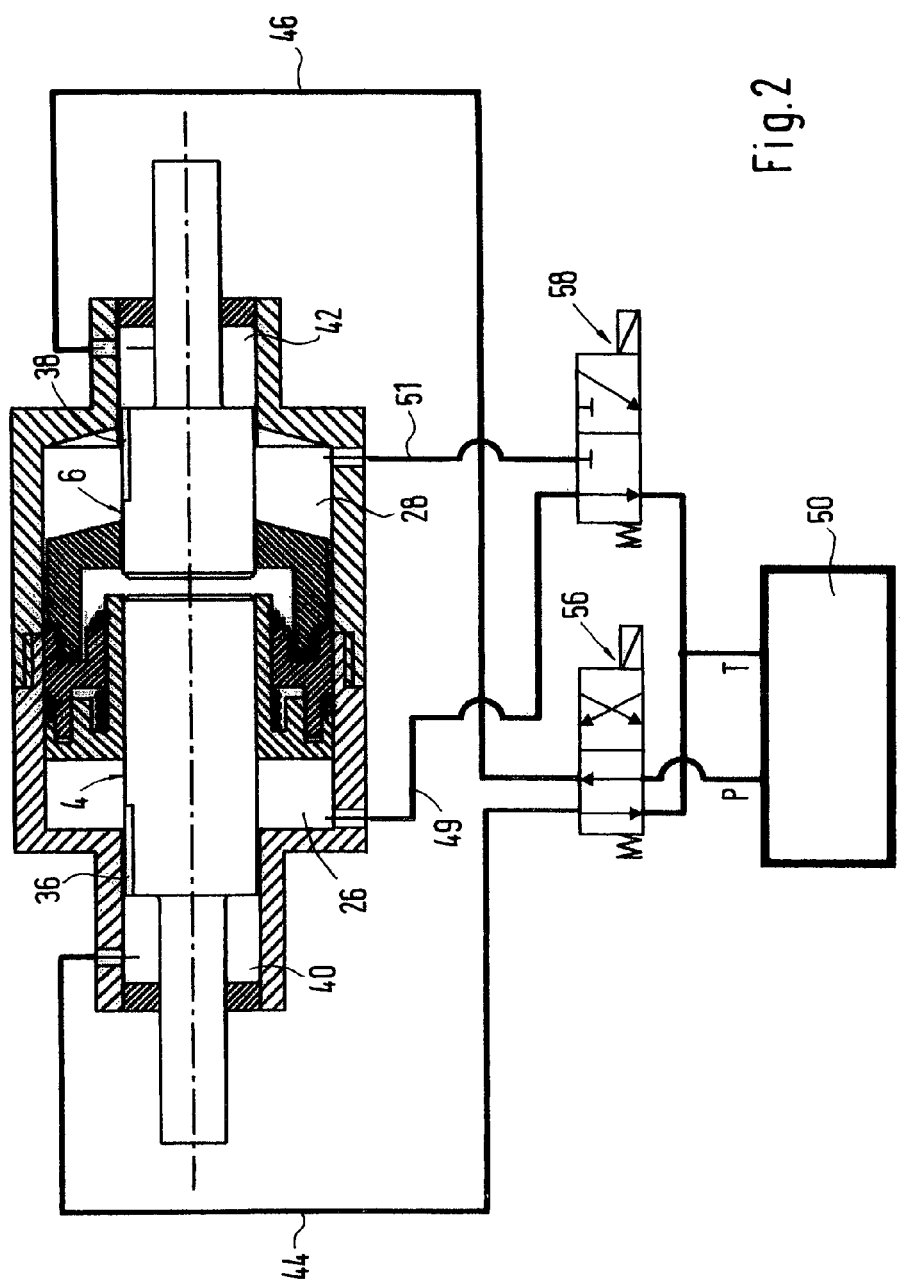
FIG. 2 is a partial cross-sectional view of a linear drive having a hydraulic control according to a second embodiment of the invention.

The second embodiment of the hydraulic linear drive illustrated in FIG. 2 differs from that of FIG. 1 only with respect to the hydraulic control. Instead of the 7/2-way control valve 48 used in the first embodiment, the controlling of the feeding and removal of hydraulic oil now takes place by way of a first 4/2 control valve 56 and a second 3/2 control valve 58. By way of the first 4/2 control valve 56, the two first pressure chambers 40, 42 respectively can optionally be acted upon by hydraulic oil, while the return of the hydraulic oil from the first two pressure chambers 26, 28 respectively is controlled by the control valve 58. The difference with respect to the first embodiment consists of the fact that, by the respective closing of the conduit 49, 51, the hydraulic oil to be returned from the respective second pressure chamber 26, 28 into the tank 50 is returned in this second embodiment by way of the longitudinal groove 36, 38 respectively, the respective first pressure chamber 40, 42 and the respective hydraulic conduit 44, 46.

As a result, an additional damping of the adjusting movement can be achieved, particularly when reaching one of the two end positions of the actuating pistons 4, 6.

The invention claimed is:

1. A hydraulic linear drive usable as a hydraulic transmission actuator, comprising a piston/cylinder unit having a housing in which an actuating piston system longitudinally displaceably arranged so as to define at least two pressure chambers which are actable upon by hydraulic oil via control conduits, having at least one piston rod connected with the actuating piston system, and a sealing element operatively arranged at the actuating piston system for sealing off the at least two pressure chambers from one another, wherein the actuating piston system comprises a two-piece construction of a first and a second piston part having facing faces between which the sealing element is arranged;

wherein a sealing device carrier is provided for the sealing element and which is axially guided on one of the piston parts;

and wherein the sealing device carrier engages on the face in the first piston part for providing the axial guiding.

2. A hydraulic linear drive usable as a hydraulic transmission actuator, comprising a piston/cylinder unit having a housing in which an actuating piston system longitudinally displaceably arranged so as to define at least two pressure chambers which are actable upon by hydraulic oil via control conduits, having at least one piston rod connected with the actuating piston system, and a sealing element operatively arranged at the actuating piston system for sealing off the at least two pressure chambers from one another, wherein the actuating piston system comprises a two-piece construction of a first and a second piston part having facing faces between which the sealing element is arranged;

wherein a sealing device carrier is provided for the sealing element and which is axially guided on one of the piston parts;

wherein the sealing device carrier is shaped in one piece out of the second piston part;

and wherein the sealing device carrier engages on the face in the first piston part for providing the axial guiding.

3. A hydraulic linear drive usable as a hydraulic transmission actuator, comprising a piston/cylinder unit having a housing in which an actuating piston system longitudinally displaceably arranged so as to define at least two pressure chambers which are actable upon by hydraulic oil via control conduits, having at least one piston rod connected with the actuating piston system, and a sealing element operatively arranged at the actuating piston system for sealing off the at least two pressure chambers from one another, wherein the actuating piston system comprises a two-piece construction of a first and a second piston part having facing faces between which the sealing element is arranged;

wherein a sealing device carrier is provided for the sealing element and which is axially guided on one of the piston parts;

wherein the sealing device carrier is a separate component between the piston parts;

and wherein the sealing device carrier engages on the face in the first piston part for providing the axial guiding.

4. A hydraulic linear drive usable as a hydraulic transmission actuator, comprising a piston/cylinder unit having a housing in which an actuating piston system longitudinally displaceably arranged so as to define at least two pressure chambers which are actable upon by hydraulic oil via control conduits, having at least one piston rod connected with the actuating piston system, and a sealing element operatively arranged at the actuating piston system for sealing off the at least two pressure chambers from one another, wherein the actuating piston system comprises a two-piece construction of a first and a second piston part having facing faces between which the sealing element is arranged;

wherein a sealing device carrier is provided for the sealing element and which is axially guided on one of the piston parts;

and wherein the sealing device carrier is longitudinally displaceably disposed on the first piston part and two stops on the first piston part are provided for limiting the relative movement of the sealing device carrier.

5. A hydraulic linear drive usable as a hydraulic transmission actuator, comprising a piston/cylinder unit having a housing in which an actuating piston system longitudinally displaceably arranged so as to define at least two pressure chambers which are actable upon by hydraulic oil via control conduits, having at least one piston rod connected with the actuating piston system, and a sealing element operatively arranged at the actuating piston system for sealing off the at least two pressure chambers from one another, wherein the actuating piston system comprises a two-piece construction of a first and a second piston part having facing faces between which the sealing element is arranged;

wherein the piston parts are step pistons;

wherein a longitudinal groove is provided at a surface area of a section of the step pistons and connects a respective pressure chamber with a respective one of the at least two pressure chambers;

wherein a sealing device carrier is provided for the sealing element and which is axially guided on one of the piston parts;

and wherein the sealing device carrier engages on the face in the first piston part for providing the axial guiding.

6. The hydraulic linear drive according to claim 5, wherein the sealing device carrier is longitudinally displaceably disposed on the first piston part and two stops on the first piston part are provided for limiting the relative movement of the sealing device carrier.

7. In a hydraulic linear drive, the improvement comprising a two-piece actuating piston having opposing faces between which a sealing element is arranged;

wherein a sealing device carrier is provided for the sealing element and which is axially guided on one of the piston parts;

and wherein the sealing device carrier engages on the face in the first piston part for providing the axial guiding.

8. In a hydraulic linear drive, the improvement comprising a two-piece actuating piston having opposing faces between which a sealing element is arranged;

wherein the sealing device carrier is longitudinally displaceably disposed on the first piston part and two stops on the first piston part are provided for limiting the relative movement of the sealing device carrier.

\* \* \* \* \*